(12) United States Patent
Sung (10) Patent No.: US 12,424,856 B2
(45) Date of Patent: Sep. 23, 2025

(54) CELL BALANCING APPARATUS, BATTERY APPARATUS INCLUDING THE SAME, AND CELL BALANCING METHOD

(71) Applicant: LG ENERGY SOLUTION, LTD., Seoul (KR)

(72) Inventor: Chang Hyun Sung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 1027 days.

(21) Appl. No.: 17/421,575

(22) PCT Filed: Oct. 20, 2020

(86) PCT No.: PCT/KR2020/014327
§ 371 (c)(1),
(2) Date: Jul. 8, 2021

(87) PCT Pub. No.: WO2021/101083
PCT Pub. Date: May 27, 2021

(65) Prior Publication Data
US 2022/0085623 A1    Mar. 17, 2022

(30) Foreign Application Priority Data
Nov. 18, 2019   (KR) .................. 10-2019-0147975

(51) Int. Cl.
*H02J 7/00*       (2006.01)
*H01M 10/42*     (2006.01)
*H01M 10/44*     (2006.01)

(52) U.S. Cl.
CPC ......... *H02J 7/0019* (2013.01); *H01M 10/441* (2013.01); *H01M 2010/4271* (2013.01); *H01M 2220/20* (2013.01)

(58) Field of Classification Search
CPC ............... H02J 7/0019; H01M 10/441; H01M 2010/4271; H01M 2220/20
(Continued)

(56) References Cited

U.S. PATENT DOCUMENTS

2011/0316344 A1   12/2011  Van Lammeren
2012/0046892 A1    2/2012  Fink
(Continued)

FOREIGN PATENT DOCUMENTS

CN    2 231 260 A1     9/1999
CN    204046239 U   *  12/2014
(Continued)

OTHER PUBLICATIONS

International Search Report (PCT/ISA/210) issued in PCT/KR2020/014327, dated Feb. 2, 2021.
(Continued)

*Primary Examiner* — Suresh Memula
(74) *Attorney, Agent, or Firm* — Birch, Stewart, Kolasch & Birch, LLP (57) ABSTRACT

A cell balancing apparatus of a battery module in which a first battery cell, a plurality of second battery cells, and a third battery cell are connected in series is provided. A first terminal of a first inductor is connected to a negative electrode of the first battery cell, and a first terminal of a second inductor is connected to a positive electrode of the third battery cell. A first transistor is connected between a second terminal of the first inductor and a second terminal of the second inductor. A first active element is connected between a positive electrode of the first battery cell and the second terminal of the first inductor, and a second active element is connected between a negative electrode of the third battery cell and the second terminal of the second inductor.

11 Claims, 10 Drawing Sheets

(58) Field of Classification Search
USPC .......................................................... 320/103
See application file for complete search history.

(56) References Cited

U.S. PATENT DOCUMENTS

| | | |
|---|---|---|
| 2012/0223669 A1 | 9/2012 | Butzmann |
| 2014/0070757 A1* | 3/2014 | Hong .................... H02J 7/0018 |
| | | 320/103 |
| 2018/0226808 A1 | 8/2018 | Kang et al. |
| 2022/0166239 A1 | 5/2022 | Yoon |

FOREIGN PATENT DOCUMENTS

| | | | | |
|---|---|---|---|---|
| CN | 204947878 U | | 1/2016 | |
| CN | 105515130 A | | 4/2016 | |
| CN | 106981905 A | * | 7/2017 | ............ H02J 7/0016 |
| CN | 110447157 A | | 11/2019 | |
| DE | 102008043611 A1 | * | 5/2010 | |
| DE | 102013021535 A1 | * | 6/2015 | .............. H02J 15/00 |
| EP | 1107438 A2 | * | 6/2001 | ........ H02M 3/33569 |
| EP | 2541728 A2 | * | 1/2013 | ............ H02J 7/0018 |
| JP | 2008-17605 A | | 1/2008 | |
| JP | 2008-42970 A | | 2/2008 | |
| JP | 2012-39855 A | | 2/2012 | |
| JP | 2013-511943 A | | 4/2013 | |
| JP | 2014-204638 A | | 10/2014 | |
| KR | 10-2012-0011363 A | | 2/2012 | |
| KR | 10-1431278 B1 | | 8/2014 | |
| KR | 10-1856037 B1 | | 5/2018 | |
| KR | 10-1957841 B1 | | 3/2019 | |

OTHER PUBLICATIONS

Extended European Search Report for European Application No. 20890183.5, dated Apr. 29, 2022.

* cited by examiner

CELL BALANCING APPARATUS, BATTERY APPARATUS INCLUDING THE SAME, AND CELL BALANCING METHOD

CROSS-REFERENCE TO RELATED APPLICATION

This application claims priority to and the benefit of Korean Patent Application No. 10-2019-0147975 filed in the Korean Intellectual Property Office on Nov. 18, 2019, the entire contents of which are incorporated herein by reference.

TECHNICAL FIELD

The described technology relates to a cell balancing apparatus, a battery apparatus including a cell balancing apparatus, and a cell balancing method.

BACKGROUND ART

Inside a battery pack, a plurality of battery cells are connected in series or in parallel. Voltage deviation between the battery cells may cause over-discharge or over-charge of the battery cells, and also reduce lifetime of the battery cells. A cell balancing circuit is designed in a battery management system (BMS) to improve the voltage deviation.

As the cell balancing circuit, a passive cell balancing circuit that maintains a balance between battery cells by consuming energy of a battery cell with a relatively high voltage as heat of resistance may be used. In this case, there is a problem in that it is difficult to increase a balancing current in accordance with the trend of increasing the capacity of the battery cell because the balancing current is limited due to heat through a resistor. To address this issue, an active cell balancing circuit has been proposed that transfers the energy of a battery cell with a relatively high voltage to a battery cell with a relatively low voltage. However, since many elements are required to implement the active cell balancing circuit, there is a problem that the cost of the cell balancing circuit is increased.

DISCLOSURE

Technical Problem

An embodiment may provide a cell balancing apparatus, a battery apparatus including the same, and a cell balancing method, for reducing the cost of a cell balancing circuit

Technical Solution

According to an embodiment, a cell balancing apparatus of a battery module in which a first battery cell, a plurality of second battery cells, and a third battery cell are connected in series is provided. The cell balancing apparatus includes a first inductor, a second inductor, a first transistor, a first active element, and a second active element. A first terminal of the first inductor is connected to a negative electrode of the first battery cell, and a first terminal of the second inductor is connected to a positive electrode of the third battery cell. The first transistor is connected between a second terminal of the first inductor and a second terminal of the second inductor. The first active element is connected between a positive electrode of the first battery cell and the second terminal of the first inductor, and the second active element is connected between a negative electrode of the third battery cell and the second terminal of the second inductor.

The first active element may include a first diode having a cathode connected to the positive electrode of the first battery cell and an anode connected to the second terminal of the first inductor, and the second active element may include a second diode having a cathode connected to the second terminal of the second inductor and an anode connected to the negative electrode of the third battery cell.

The cell balancing apparatus may further include a processing circuitry that repeats an operation of turning on and an operation of turning off the first transistor during cell balancing.

The first active element may include a second transistor connected between the positive electrode of the first battery cell and the second terminal of the first inductor, and the second active element may include a third transistor connected between the second terminal of the second inductor and the negative electrode of the third battery cell.

The cell balancing apparatus may further include a processing circuitry that repeats an operation of turning on and an operation of turning off the second transistor and third transistor during cell balancing for transferring energy of the first battery cell and the third battery cells to the second battery cells.

The processing circuitry may repeat an operation of turning on and an operation of turning off the first transistor during cell balancing for transferring energy of the second battery cells to the first battery cell and the third battery cell.

Each of the second transistor and the third transistors may have a body diode.

In the battery module, the first battery cell may be an outermost battery cell in a positive electrode direction, and the third battery cell may be an outermost battery cell in a negative electrode direction.

According to another embodiment, a battery apparatus including a battery module in which a first battery cell, a plurality of second battery cells, and a third battery cells are connected in series, a cell balancing circuit including a first inductor connected to a negative electrode of the first battery cell and a second inductor connected to a positive electrode of the third battery cell, and a processing circuitry is provided. To transfer energy of the second battery cells to the first battery cell and the third battery cell, the processing circuitry transfers a current into the first inductor and the second inductor through a first current path formed through the second battery cells, the first inductors, and the second inductor in a first period, and transfers the current transferred into the first inductor to the first battery cell through a second current path formed through the first inductor and the first battery cell, and transfers the current transferred into the second inductor to the third battery cell through a third current path formed through the second inductor and the third battery cell, in a second period.

To transfer energy of the first battery cell and the third battery cell to the second battery cells, the processing circuitry may transfer a current into the first inductor through a fourth current path formed through the first battery cell and the first inductor, and transfer a current into the second inductor through a fifth current path formed through the third battery cell and the second inductor in a third period, and may transfer the current transferred into the first inductor to the second battery cells through a sixth current path formed through the first inductor and the second battery cells, and transfer the current transferred into the second inductor to the second battery cells through a seventh current path formed through the second inductor and the second battery cells, in a fourth period.

According to yet another embodiment, a cell balancing method of a battery module in which a first battery cell, a plurality of second battery cells, and third battery cells are connected in series is provided. The cell balancing method includes transferring energy of the second battery cells to the first and third battery cell when voltages of the first battery cell and the third battery cell are lower than voltages of the second battery cells, and transferring energy of the first battery cell and the third battery cell to the second battery cells when the voltages of the first battery cell and the third battery cell are higher than the voltages of the second battery cells.

Advantageous Effects

According to one embodiment, the cost can be reduced by reducing the number of elements in a cell balancing circuit.

MODE FOR INVENTION

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

When it is described that an element is "connected" to another element, it should be understood that the element may be directly connected to the other element or connected to the other element through a third element. On the other hand, when it is described that an element is "directly connected" to another element, it should be understood that the element is connected to the other element through no third element.

As used herein, a singular form may be intended to include a plural form as well, unless the explicit expression such as "one" or "single" is used.

Figure 1:
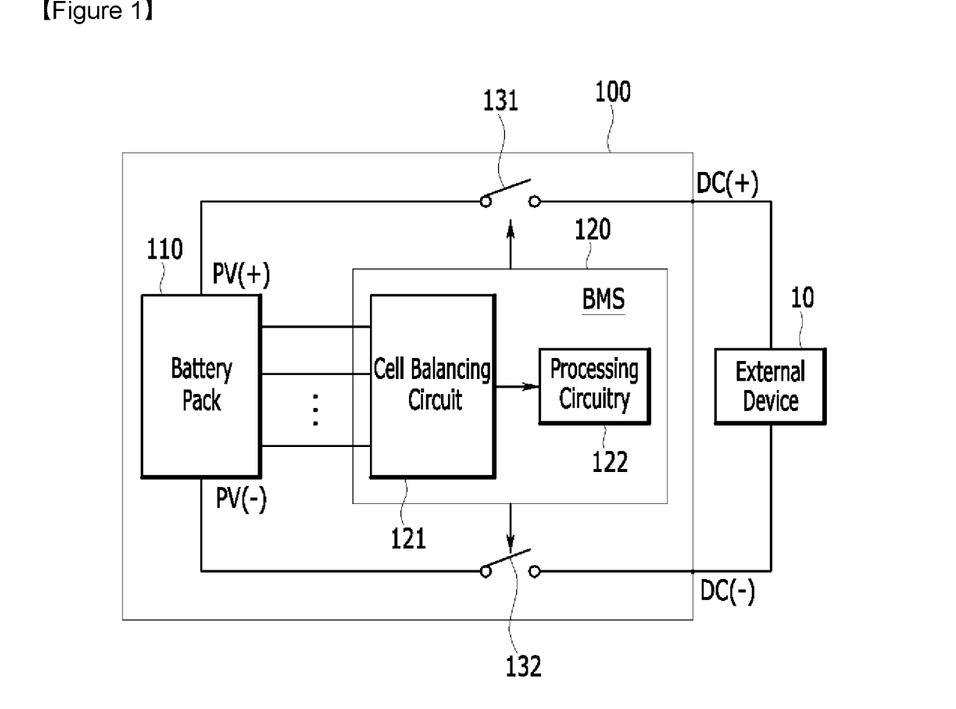
FIG. 1 is a drawing showing a battery apparatus according to an embodiment.

FIG. 1 is a drawing showing a battery apparatus according to an embodiment.

Referring to FIG. 1, a battery apparatus 100 has a structure that can be electrically connected to an external device 10. When the external device 10 is a load, the battery apparatus 100 is discharged by operating as a power supply that supplies power to the load 10. When the external device 10 is a charger, the battery apparatus 100 is charged by receiving external power through the charger 10.

The external device 10 operating as the load may be, for example, an electronic device, a mobility apparatus, or an energy storage system (ESS). The mobility apparatus may be, for example, an electric vehicle, a hybrid vehicle, or a smart mobility.

The battery apparatus 100 includes a battery pack 110, a battery management system (BMS) 120, and switches 131 and 132.

The battery pack 110 includes a plurality of battery cells (not shown) that are electrically connected. In some embodiments, the battery cell may be a rechargeable battery. The battery pack 110 may include a battery module in which a predetermined number of battery cells are connected in series. In some embodiments, a predetermined number of battery modules may be connected in series or in parallel in the battery pack 110 to supply desired power.

The battery pack 110 is connected to the battery management system 120 through wiring. The battery management system 120 may collect and analyze various information related to the battery cells including information on the battery cells to control charging and discharging of the battery cells, cell balancing, a protection operation, and also control operations of the switches 131 and 132.

The battery management system 120 includes a cell balancing circuit 121 and a processing circuitry 122. The cell balancing circuit 121 corresponds to the battery module of battery pack 110. In some embodiments, when the battery pack 110 includes a plurality of battery modules, a plurality of cell balancing circuits 121 corresponding to the plurality of battery modules respectively may be provided. The cell balancing circuit 121 performs cell balancing between an outer battery cell and an inner battery cell among a plurality of battery cells connected in series. In some embodiments, the cell balancing circuit 121 may perform the cell balancing under control of the processing circuitry 122 when the cell balancing is required.

The switches 131 and 132 are connected between the battery pack 110 and the external device 10 to control electrical connection between the battery pack 110 and the external device 10. For example, the switch 131 may be connected between a positive output terminal PV(+) to which a positive voltage of the battery pack 110 is output and a positive link terminal DC(+) to be connected to the external device 10, and the switch 132 may be connected between a negative output terminal PV(-) to which a negative voltage of the battery pack 110 is output and a negative link terminal DC(-) to be connected to the external device 10. In some embodiments, the switches 131 and 132 may be transistors or relays.

The processing circuitry 122 controls an operation of the cell balancing circuit 121 and operations of the switches 131 and 132. The processing circuitry 122 may be a circuit including a processor, and the processor may be, for example, a micro controller unit (MCU). In addition, the processing circuitry 122 may further include a driver that controls a switching operation of the cell balancing circuit 122 according to the control of the processor.

In some embodiments, the battery management system 120 may further include a cell voltage monitoring circuit (not shown). The processing circuitry 122 may determine whether balancing is required based on a voltage of the battery cell detected by the cell voltage monitoring circuit.

Hereinafter, a cell balancing circuit of a battery management system according to an embodiment is described with reference to FIG. 2 to FIG. 5.

Figure 2:
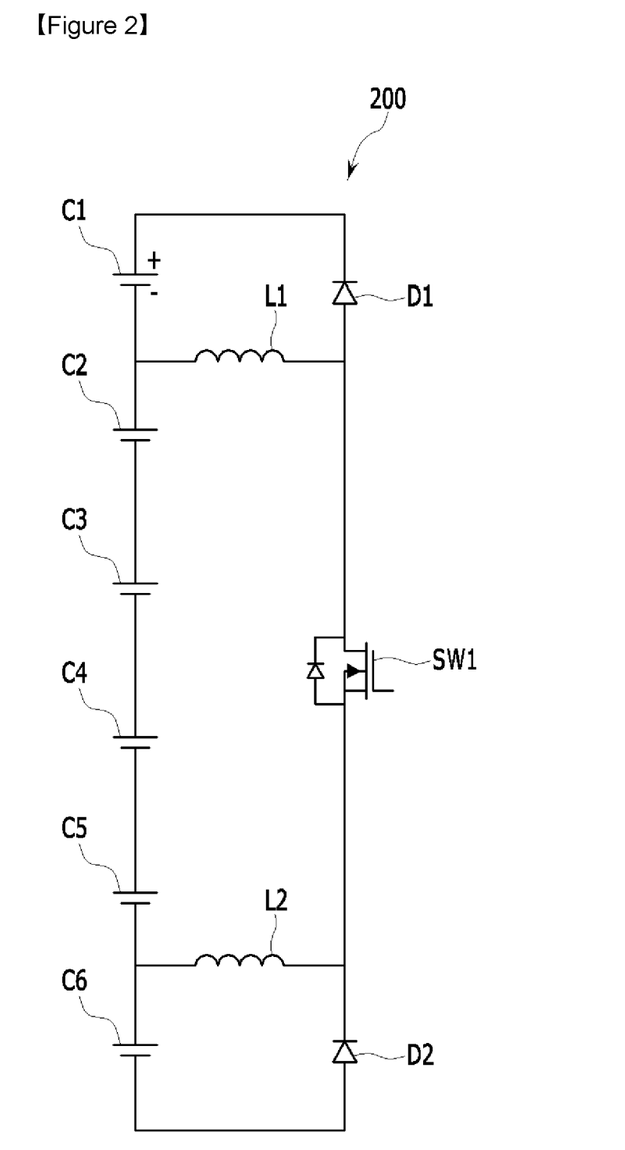
FIG. 2 is a drawing showing an example of a balancing circuit of a battery management system according to an embodiment.
Figure 3:
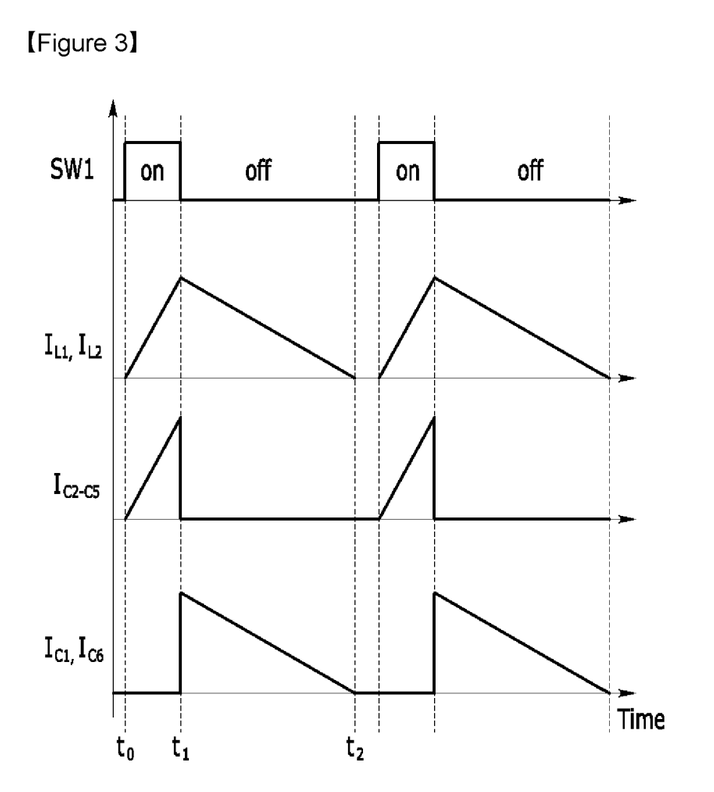
FIG. 3 is a drawing showing signal timing and current of a balancing circuit shown in FIG. 2.
Figure 4:
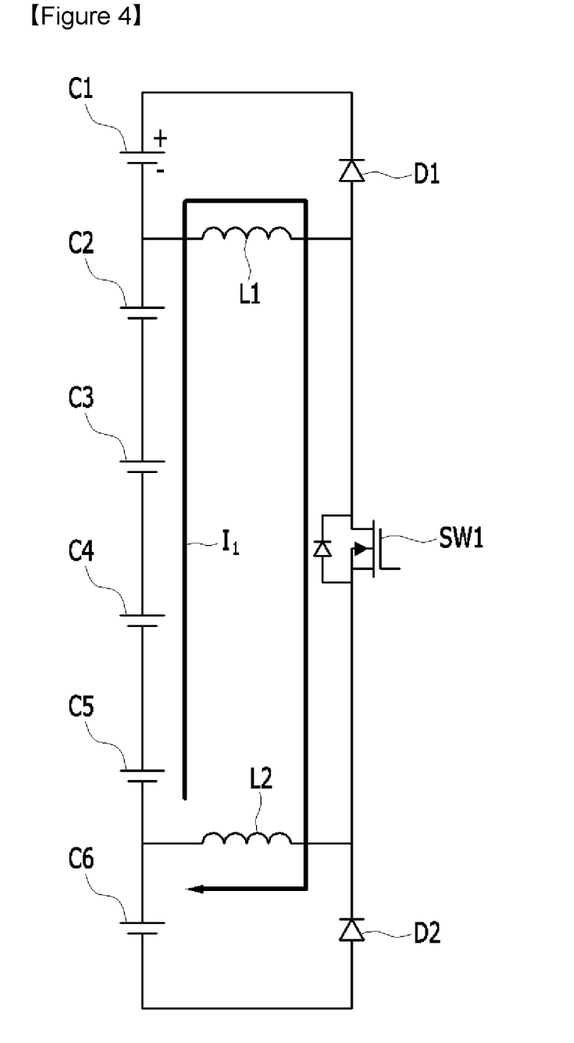
FIG. 4 and FIG. 5 are drawings showing a current path of a balancing circuit shown in FIG. 2.
Figure 5:
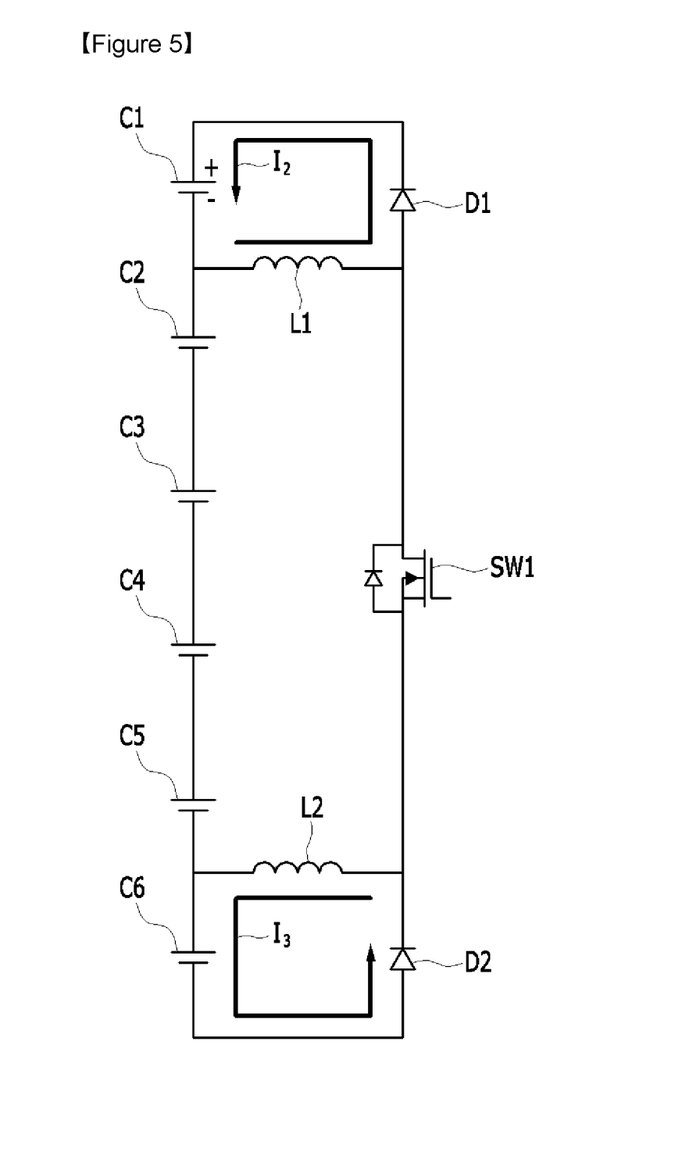

FIG. 2 is a drawing showing an example of a balancing circuit of a battery management system according to an embodiment, and FIG. 3 is a drawing showing signal timing and current of a balancing circuit shown in FIG. 2, and FIG. 4 and FIG. 5 are drawings showing a current path of a balancing circuit shown in FIG. 2. In FIG. 2 to FIG. 5, for convenience, the number of battery cells included in a battery module and connected in series is assumed to be six, but is not limited to six.

Referring to FIG. 2, a cell balancing circuit 200 includes a transistor SW1, inductors L1 and L2, and diodes D1 and D2.

A first terminal of the inductor L1 is connected to a contact between an outermost battery cell C1 in a positive electrode direction among a plurality of battery cells C1, C2, C3, C4, C5, and C6, and a battery cell C2 adjacent to the outermost battery cell C1, i.e., a negative electrode of the outermost battery cell C1 and a positive electrode of the adjacent battery cell C2. The diode D1 is connected between a positive electrode of the outermost battery cell C1 and a second terminal of the inductor L1. Specifically, a cathode of diode D1 is connected to the positive electrode of the outermost battery cell C1, and an anode of diode D1 is connected to the second terminal of the inductor L1.

A first terminal of the inductor L2 is connected to a contact between an outermost battery cell C6 in a negative electrode direction among the plurality of battery cells C1 to C6 and a battery cell C5 adjacent to the outermost battery cell C6, i.e., a positive electrode of the outermost battery cell C6 and a negative electrode of the adjacent battery cell C5. The diode D2 is connected between a negative electrode of the outermost battery cell C6 and a second terminal of the inductor L2. Specifically, an anode of diode D2 is connected to the negative electrode of the outermost battery cell C6, and a cathode of diode D2 is connected to the second terminal of the inductor L2.

The transistor SW1 is connected between the second terminal of inductor L1 (i.e., the anode of the diode D1) and the second terminal of inductor L2 (i.e., the cathode of the diode D2). Specifically, a first terminal of the transistor SW1 is connected to the second terminal of the inductor L1, and a second terminal of the transistor SW1 is connected to the second terminal of the inductor L2. The transistor SW1 may be turned on or off in response to a control signal that is transferred to its control terminal from a processing circuitry (122 of FIG. 1), for example, a driver of the processing circuitry 122. In some embodiments, the transistor SW1 may be a metal-oxide semiconductor field-effect transistor (MOSFET). In this case, the transistor SW1 may have a body diode. In one embodiment, as shown in FIG. 2, the transistor SW1 may be an n-channel transistor, for example an NMOS transistor. In this case, the transistor SW1 has a drain, a source and a gate as the first terminal, the second terminal and the control terminal, respectively.

Referring to FIG. 3 and FIG. 4, when balancing is required, the transistor SW1 is turned on in response to a control signal from a processing circuitry (122 of FIG. 1) at t0. Then, a current path $I_1$ is formed through the inner battery cells C2 to C5 among the plurality of battery cells, the inductor L1, the transistor SW1, and the inductor L2. Currents $I_{L1}$ and $I_{L2}$ flowing through the inductors L1 and L2 gradually increase by voltages of the inner battery cells C2 to C5, and a current $I_{C2-C5}$ flowing through the inner battery cells C2 to C5 also gradually increases. That is, during a period from $t_0$ to $t_1$, energy of the inner battery cells C2 to C5 may be injected into the inductors L1 and L2.

Next, referring to FIG. 3 and FIG. 5, the transistor SW1 is turned off at $t_1$ so that a current path $I_2$ is formed through the inductor L1, the diode D1, and the outermost battery cell C1 in the positive electrode direction, and a current path $I_3$ is formed through the inductor L2, the outermost battery cell C6 in the negative electrode direction, and the diode D2. Accordingly, the currents $I_{L1}$ and $I_{L2}$ flowing through the inductors L1 and L2 are supplied to the outermost battery cells C1 and C6, so the currents $I_{L1}$ and $I_{L2}$ flowing through the inductors L1 and L2 gradually decrease, and currents $I_{C1}$ and $I_{C6}$ flowing through the outermost battery cells C1 and C6 also gradually decrease. That is, energy injected into the inductors L1 and L2 during the period from $t_1$ to $t_2$ is supplied to the outermost battery cells C1 and C6, so the outermost battery cells C1 and C6 can be charged. Here, $t_2$ may be a time point when the currents $I_{L1}$ and $I_{L2}$ flowing through the inductors L1 and L2 become zero.

Next, the processing circuitry 122 may repeat an operation ($t_0$ to $t_1$) of injecting the currents $I_{L1}$ and $I_{L2}$ into the inductors L1 and L2 and an operation of ($t_1$ to $t_2$) of charging the outermost battery cells C1 and C6 with the current flowing through the inductors L1 and L2 until the balancing is complete.

Although it is shown in FIG. 2 that the diodes D1 and D2 are used as active elements to form the current paths among the outermost battery cells C1 and C6 and the inductors L1 and L2, other active elements may be used instead of the diodes D1 and D2. In some embodiments, transistors may be used instead of the diodes D1 and D2. In one embodiment, when the transistor SW1 is turned on, the transistors used instead of the diodes may be turned off, and when the transistor SW1 is turned off, the transistors used instead of the diodes may be turned on. In another embodiment, the transistors used instead of the diodes may be maintained in the off-state regardless of the on/off of the transistor SW1. In this case, the currents injected into the inductors L1 and L2 may be transmitted to the outermost battery cells C1 and C6 through body diodes of the transistors, respectively.

Figure 6:
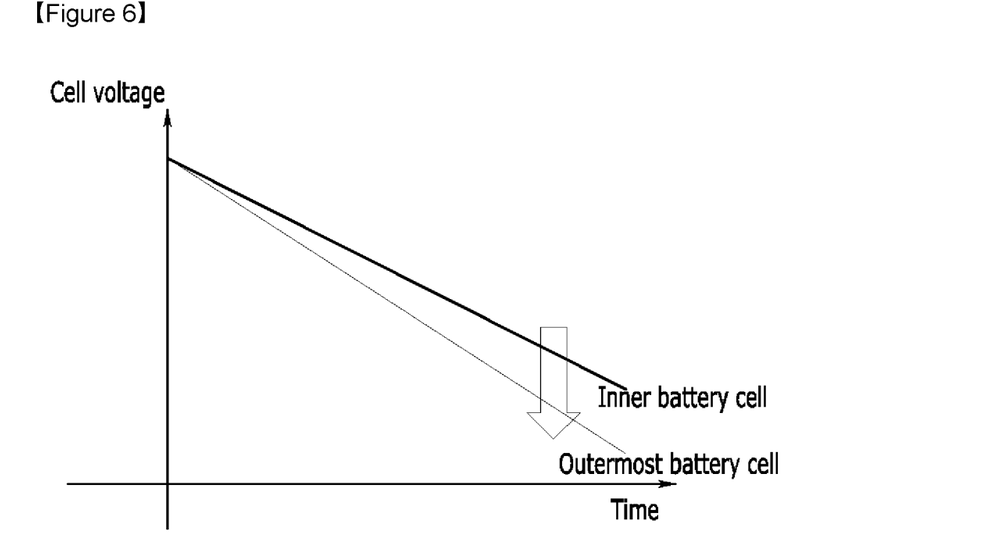
FIG. 6 is a diagram showing cell voltages of an outermost battery cell and an inner battery cell during discharge.

When a battery apparatus (100 of FIG. 1) supplies energy to an external device (10 of FIG. 1), as shown in FIG. 6, the outermost battery cell may be first discharged because a temperature of the outermost battery cell in a battery module is low. According to some embodiments, energy of the inner battery cells C2 to C6 can be transferred to the outermost battery cells through the inductors L1 and L2 to perform the balancing. In addition, the number of elements can be reduced compared to a conventional active cell balancing circuit that uses an inductor and a transistor for each battery cell, thereby reducing the cost of the cell balancing circuit.

Figure 7:
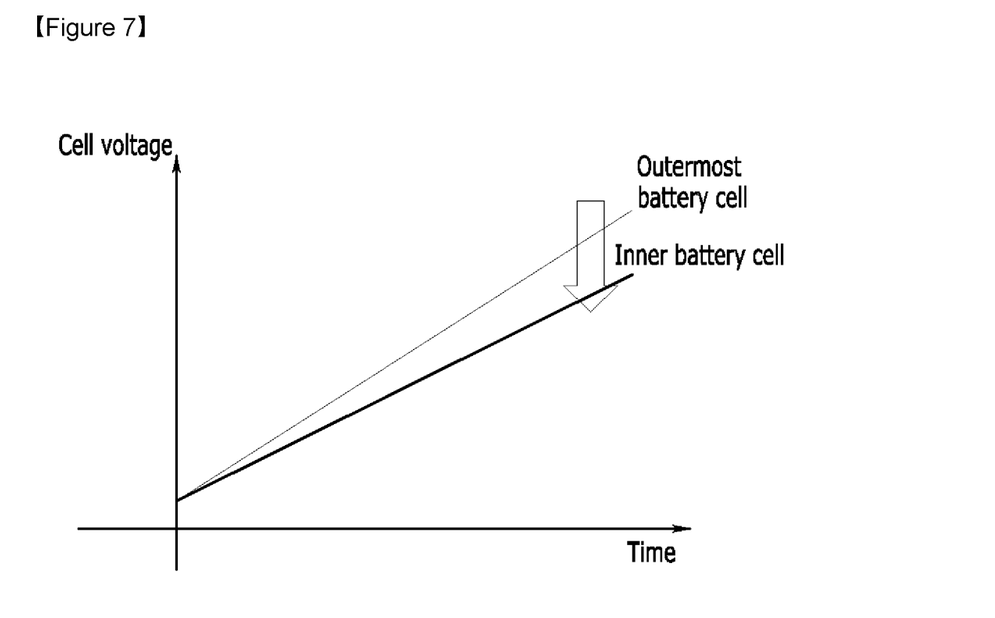
FIG. 7 is a diagram showing cell voltages of an outermost battery cell and an inner battery cell during charging.

When the battery apparatus 100 is charged through the external device 10 which is a charger, as shown in FIG. 7, the outermost battery cell can be first charged compared to the inner battery cell. In this case, the balancing may be performed by transferring the energy of the outermost battery cell to the inner battery cell. However, the cell balancing circuit shown in FIG. 2 may not transfer the energy of the outermost battery cell to the inner battery cell.

Hereinafter, a cell balancing circuit that can transfer energy of an outermost battery cell to an inner battery cell is described with reference to FIG. 8 to FIG. 11.

Figure 8:
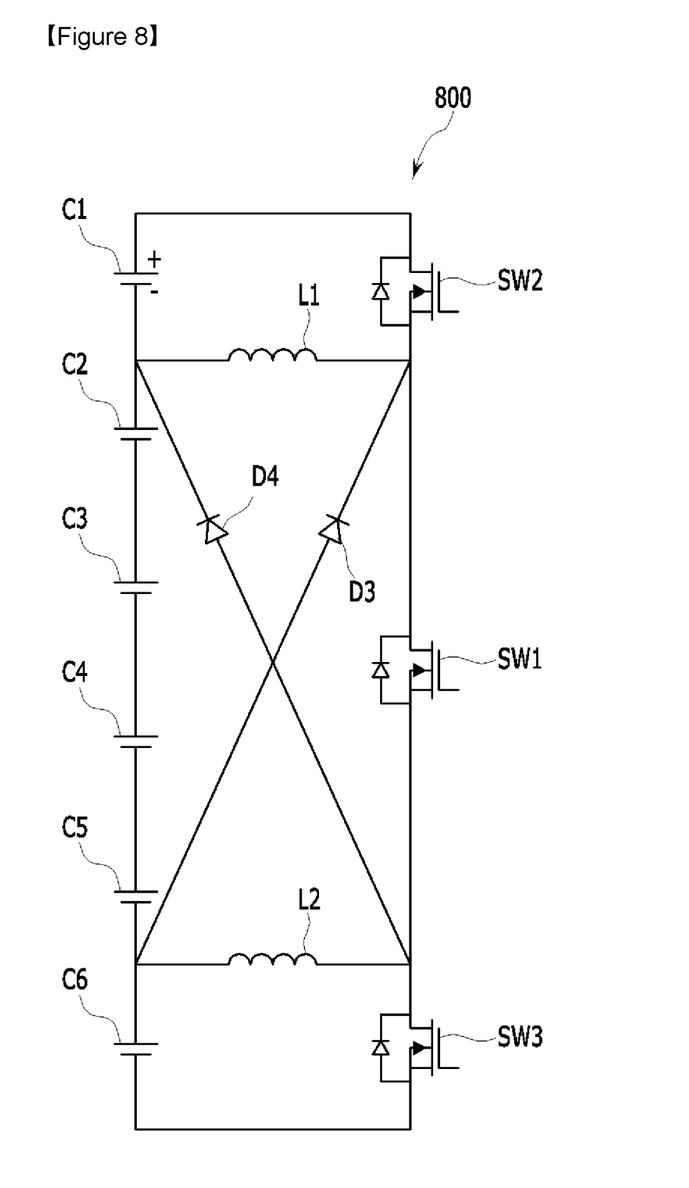
FIG. 8 is a drawing showing an example of a balancing circuit of a battery management system according to another embodiment.
Figure 9:
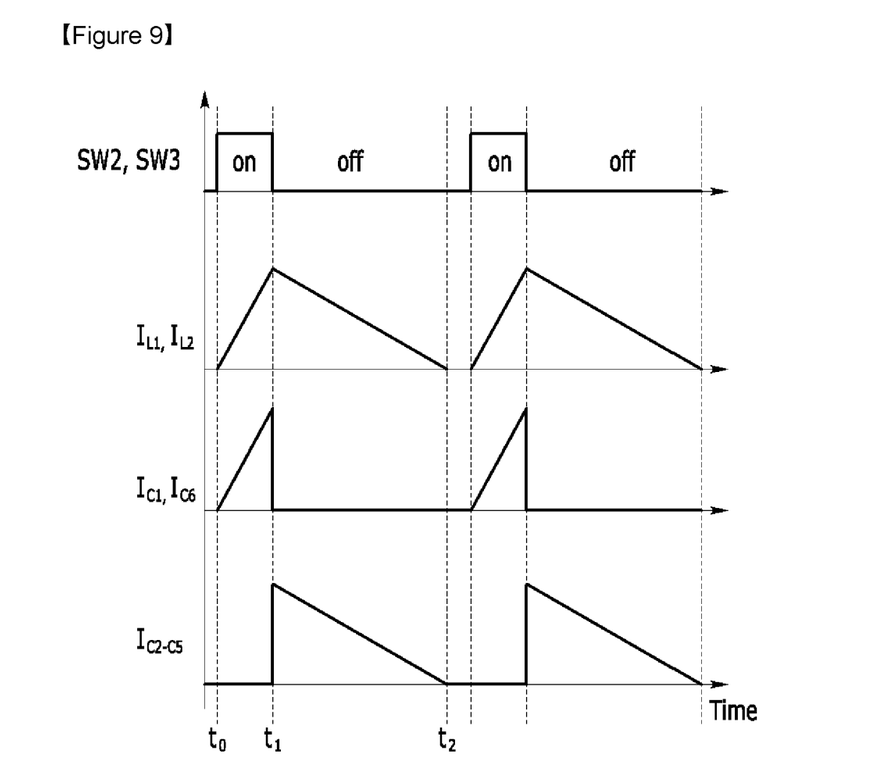
FIG. 9 is a drawing showing signal timing and current of a balancing circuit shown in FIG. 8.
Figure 10:
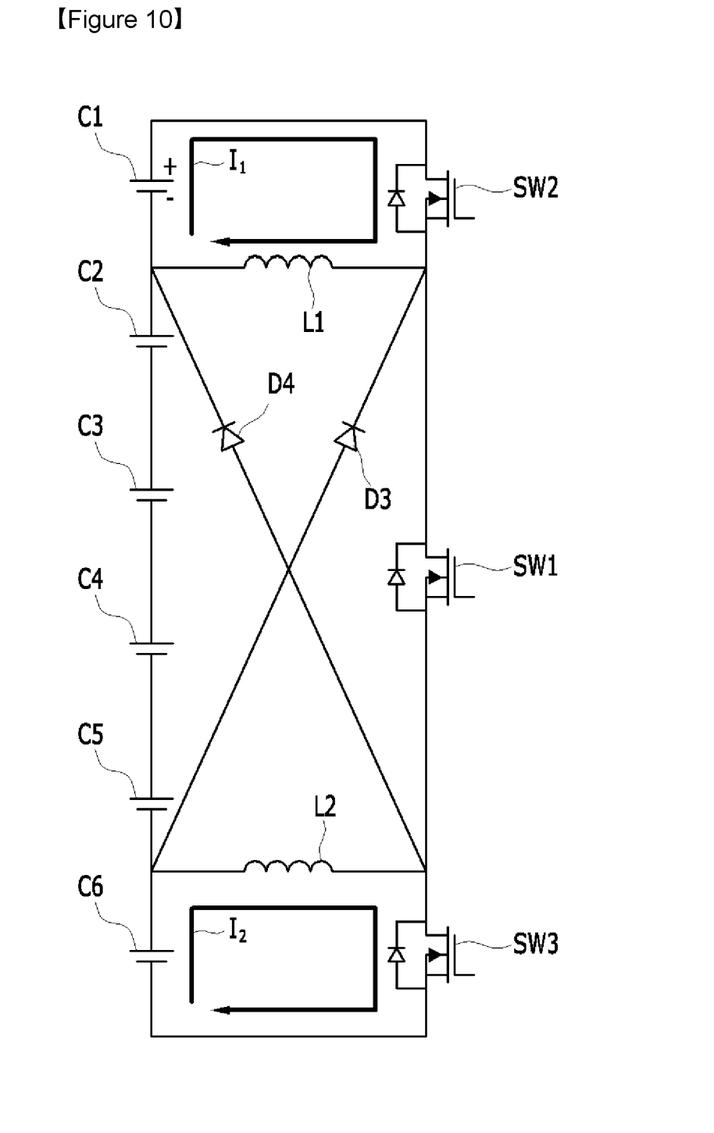
FIG. 10 and FIG. 11 are drawings showing a current path of a balancing circuit shown in FIG. 8.
Figure 11:
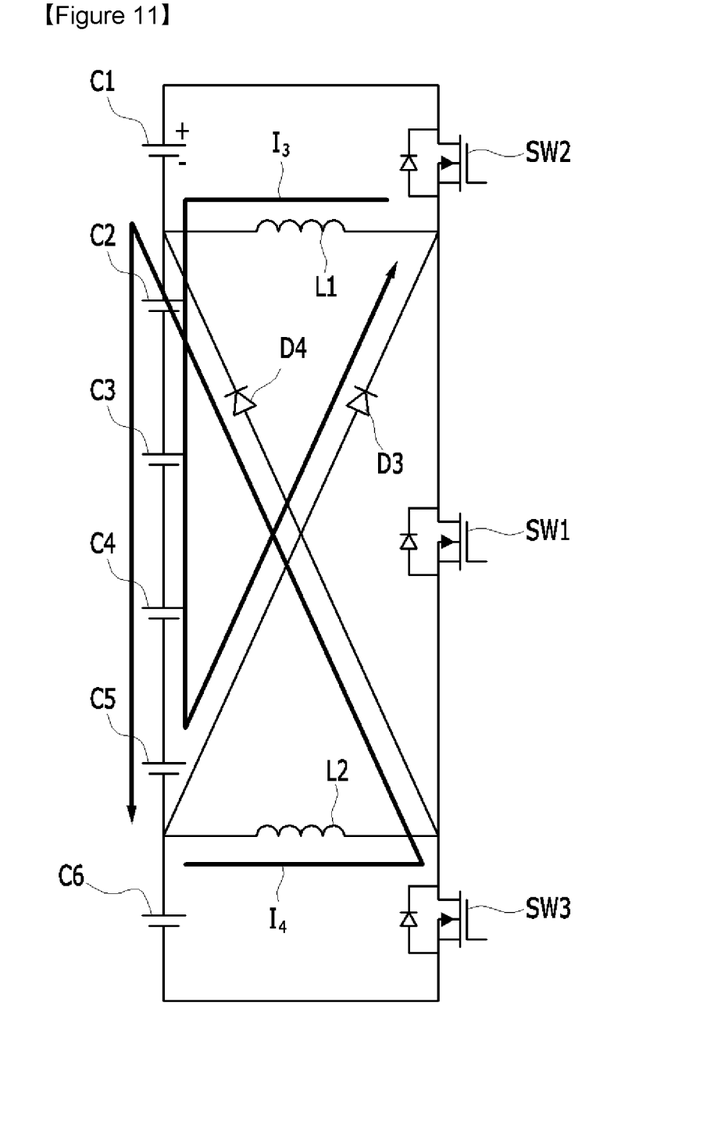

FIG. 8 is a drawing showing an example of a balancing circuit of a battery management system according to another embodiment, FIG. 9 is a drawing showing signal timing and current of a balancing circuit shown in FIG. 8, and FIG. 10 and FIG. 11 are drawings showing a current path of a balancing circuit shown in FIG. 8. In FIG. 8 to FIG. 11, for convenience, the number of battery cells included in a battery module and connected in series is assumed to be six, but is not limited to six.

Referring to FIG. 8, a cell balancing circuit 800 includes transistors SW1, SW2, and SW3, inductors L1 and L2, and diodes D3 and D4.

The transistor SW1 and the inductors L1 and L2 have a similar connection relationship with those of the cell balancing circuit 200 described with reference to FIG. 2.

A first terminal of the inductor L1 is connected to a contact between an outermost battery cell C1 in a positive electrode direction among a plurality of battery cells C1 to C6, and a battery cell C2 adjacent to the outermost battery cell C1, i.e., a negative electrode of the outermost battery cell C1 and a positive electrode of the adjacent battery cell C2. The transistor SW2 is connected between a positive electrode of the outermost battery cell C1 and a second terminal of the inductor L1. Specifically, a first terminal of transistor SW2 is connected to the positive electrode of the outermost battery cell C1, and a second terminal of transistor SW2 is connected to the second terminal of the inductor L1.

A first terminal of the inductor L2 is connected to a contact between an outermost battery cell C6 in a negative electrode direction among the plurality of battery cells C1 to C6 and a battery cell C5 adjacent to the outermost battery cell C6, i.e., a positive electrode of the outermost battery cell C6 and a negative electrode of the adjacent battery cell C5. The transistor SW3 is connected between a negative electrode of the outermost battery cell C6 and a second terminal of the inductor L2. Specifically, a first terminal of transistor SW2 is connected to the second terminal of inductor L2, and a second terminal of transistor SW2 is connected to the negative electrode of outermost battery cell C6.

The diode D3 is connected between a negative electrode of battery cell C5 adjacent to the outermost battery cell C6 in the negative electrode direction (i.e., the positive electrode of the outermost battery cell C6 and the first terminal of the inductor L2) and the second terminal of the inductor L1 (i.e., the second terminal of the transistor SW2). Specifically, an anode of diode D3 is connected to the negative electrode of the adjacent battery cell C5, and a cathode of diode D3 is connected to the second terminal of the inductor L1. The diode D4 is connected between a positive electrode of the battery cell C2 adjacent to the outermost battery cell C1 in the positive electrode direction (i.e., the negative electrode of outermost battery cell C1 and the first terminal of the inductor L2) and the second terminal of inductor L1 (i.e., the second terminal of transistor SW2). Specifically, a cathode of diode D4 is connected to the positive electrode of the adjacent battery cell C2, and an anode of diode D4 is connected to the second terminal of the inductor L2.

The transistor SW1 is connected between the second terminal of the inductor L1 (i.e., the second terminal of the transistor SW2 and the cathode of the diode D3) and the second terminal of the inductor L2 (i.e., the first terminal of the transistor SW3 and the anode of diode D4). Specifically, a first terminal of the transistor SW1 is connected to the second terminal of the inductor L1, and a second terminal of the transistor SW1 is connected to the second terminal of the inductor L2.

The transistors SW1, SW2, and SW3 may be turned on or off in response to control signals that are transferred to their control terminals from a processing circuitry (122 of FIG. 1), for example, a driver of the processing circuitry 122. In some embodiments, the transistors SW1, SW2, and SW3 may be metal-oxide semiconductor field-effect transistors (MOSFETs). In this case, the transistors SW1, SW2, and SW3 may have body diodes. In one embodiment, as shown in FIG. 8, the transistors SW1, SW2, and SW3 may be n-channel transistors, for example, NMOS transistors. In this case, each of the transistors SW1, SW2, and SW3 has a drain, a source and a gate as the first terminal, the second terminal and the control terminal, respectively.

Referring to FIG. 9 and FIG. 10, when balancing is required to transfer energy of the outermost battery cells C1 and C6 to the inner battery cells C2 to C5, the transistors SW2 and SW3 are turned on in response to a control signal from a processing circuitry (122 of FIG. 1) at $t_0$. Then, a current path $I_1$ is formed through the outermost battery cell C1 in the positive electrode direction, the transistor SW2 and the inductor L1, and a current path $I_2$ is formed through the outermost battery cell C6 in the negative electrode direction, the inductor L2, and the transistor SW3. Currents $I_{L1}$ and $I_{L2}$ flowing through the inductors L1 and L2 gradually increase by voltages of the outermost battery cells C1 and C6, and currents $I_{C1}$ and $I_{C6}$ flowing through the outermost battery cells C1 and C6 also gradually increase. That is, the energy of the outermost battery cells C1 and C6 may be injected into the inductors L1 and L2 during a period from $t_0$ to $t_1$.

Next, referring to FIG. 9 and FIG. 11, the transistor SW2 and SW3 are turned off at $t_1$ so that a current path $I_3$ is formed through the inductor L1, the inner battery cells C2 to C5, and the diode D3, and a current path $I_4$ is formed through the inductor L2, the diode D4, and the inner battery cells C2 to C5. The currents $I_{L1}$ and $I_{L2}$ flowing through the inductors L1 and L2 are supplied to the inner battery cells C2 to C5, so the currents $I_{L1}$ and $I_{L2}$ flowing through the inductors L1 and L2 gradually decrease, and a current $I_{C2-C5}$ flowing through the inner battery cells C2 to C5 also gradually decreases. That is, the energy injected into the inductors L1 and L2 during the period from $t_1$ to $t_2$ is supplied to the inner battery cells C2-C5, so the inner battery cells C2 to C5 can be charged. Here, $t_2$ may be a time point when the currents $I_{L1}$ and $I_{L2}$ flowing through the inductors L1 and L2 become zero.

Next, the processing circuitry 122 may repeat an operation ($t_0$ to $t_1$) of injecting the currents $I_{L1}$ and $I_{L2}$ into the inductors L1 and L2 and an operation ($t_1$ to $t_2$) of charging the outermost battery cells C1 and C6 with the currents flowing through the inductors L1 and L2 until the balancing is complete.

On the other hand, when balancing is required to transfer energy of the inner battery cells C2 to C5 to the outermost battery cells C1 and C6, the balancing may be performed by repeating an operation of turning on and an operation of turning off the transistor SW1 as described with reference to FIG. 3 to FIG. 5.

Specifically, as shown in FIG. 2, the processing circuitry 122 first turns on the transistor SW1 to form a current path through the inner battery cells C2 to C5, the inductor L1, the transistor SW1, and the inductor L2. Accordingly, energy of the inner battery cells C2 to C5 can be injected into the inductors L1 and L2.

Next, the processing circuitry 122 turns off the transistor SW1 to form a current path through the inductor L1, the transistor SW2 and the outermost battery cell C1 in the positive electrode direction, and a current path through the inductor L2, the outermost battery cell C6 in the negative electrode direction, and the transistor SW3. Accordingly, the energy injected into the inductors L1 and L2 are supplied to the outermost battery cells C1 and C6, so the outermost battery cells C1 and C6 can be charged.

In some embodiments, the two current paths for supplying the energy to the outermost battery cells C1 and C6 may be formed through the body diode of transistor SW2 and the body diode of transistor SW3, respectively. In one embodiment, the transistors SW2 and SW3 may be turned off when the transistor SW1 is turned on, and the transistors SW2 and SW3 may be turned on when the transistor SW1 is turned off. In another embodiment, the transistors SW2 and SW3 may be maintained in the off-state regardless of on/off of the transistor SW1.

As described above, according to another embodiment, as in a case where the battery apparatus (100 of FIG. 1) is charged, when the voltage of the outermost battery cell is higher than the voltage of the inner battery cell, the energy of the outermost battery cell can be transferred to the inner battery cell to perform the balancing. In addition, as in a case where the battery apparatus 100 supplies energy to an external device (10 of FIG. 1), when the voltage of the outermost battery cell is lower than the voltage of the inner battery cell, the energy of the inner battery cell can be transferred to the outermost battery cell to perform the balancing.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

The invention claimed is:

1. A cell balancing apparatus of a battery module comprising a first outermost battery cell, a plurality of inner battery cells, and a second outermost battery cell connected in series, the cell balancing apparatus comprising:
    a first inductor having a first terminal connected to a negative electrode of the first outermost battery cell;
    a second inductor having a first terminal connected to a positive electrode of the second outermost battery cell;
    a first transistor connected between a second terminal of the first inductor and a second terminal of the second inductor;
    a first active element connected between a positive electrode of the first outermost battery cell and the second terminal of the first inductor; and
    a second active element connected between a negative electrode of the second outermost battery cell and the second terminal of the second inductor,
    wherein the plurality of inner battery cells comprise at least a first inner battery cell and a second inner battery cell directly connected to each other,
    wherein the first terminal of the first inductor is connected to a positive terminal of the first inner battery cell, and
    wherein the first terminal of the second inductor is connected to a negative terminal of the second inner battery cell.

2. The cell balancing apparatus of claim 1, wherein the first active element comprises a first diode having a cathode connected to the positive electrode of the first outermost battery cell and an anode connected to the second terminal of the first inductor, and
    wherein the second active element comprises a second diode having a cathode connected to the second terminal of the second inductor and an anode connected to the negative electrode of the second outermost battery cell.

3. The cell balancing apparatus of claim 2, further comprising a processing circuitry that repeats an operation of turning on and an operation of turning off the first transistor during cell balancing.

4. The cell balancing apparatus of claim 1, wherein the first active element comprises a second transistor connected between the positive electrode of the first outermost battery cell and the second terminal of the first inductor, and
    wherein the second active element comprises a third transistor connected between the second terminal of the second inductor and the negative electrode of the second outermost battery cell.

5. The cell balancing apparatus of claim 4, further comprising a processing circuitry that repeats an operation of turning on and an operation of turning off the second transistor and the third transistor during cell balancing for transferring energy of the first outermost battery cell and the second outermost battery cell to the plurality of inner battery cells.

6. The cell balancing apparatus of claim 5, wherein the processing circuitry repeats an operation of turning on and an operation of turning off the first transistor during cell balancing for transferring energy of the plurality of inner battery cells to the first outermost battery cell and the second outermost battery cell.

7. The cell balancing apparatus of claim 6, wherein each of the second transistor and the third transistors has a body diode.

8. The cell balancing apparatus of claim 1, wherein in the battery module, the first outermost battery cell is the outermost battery cell in a positive electrode direction, and the second outermost battery cell is the outermost battery cell in a negative electrode direction.

9. The cell balancing apparatus of claim 1, wherein each of the plurality of inner battery cells is directly connected to adjacent inner battery cells of the plurality of inner battery cells in series.

10. The cell balancing apparatus of claim 1, wherein inner battery cells of the plurality of inner battery cells other than the first inner battery cell and the second inner battery cell are not connected to an inductor.

11. The cell balancing apparatus of claim 1, wherein the first transistor is configured to be controlled by processing circuitry, and
    wherein when the first transistor is turned on, a current path is formed through the plurality of inner battery cells.

* * * * *